July 30, 1957  I. COHEN  2,800,715
PINKING SHEARS
Filed July 20, 1956

Irvin Cohen
INVENTOR.

BY *Clarence A. O'Brien*
*and Harvey B. Jacobson*
Attorneys

United States Patent Office 2,800,715
Patented July 30, 1957

2,800,715

PINKING SHEARS

Irvin Cohen, Reading, Pa.

Application July 20, 1956, Serial No. 599,141

5 Claims. (Cl. 30—230)

This invention generally relates to pinking shears and more particularly the type of pinking shears or scissors adapted for cutting cloth and including zig-zag cutting edges for preventing the unravelling of the cloth.

An object of the present invention is to provide a pair of pinking shears incorporating novel structural features which renders the pinking shears economical in manufacture, long lasting, efficient in its cutting operation, and well adapted for its intended purposes.

Another object of the present invention is to provide a pair of pinking shears having a replaceable cutting blade that is provided with hardened cutting edges with the blade having a freely floating outer end whereby the alternating ridges and teeth are self-centered and aligned for the most effective cutting operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
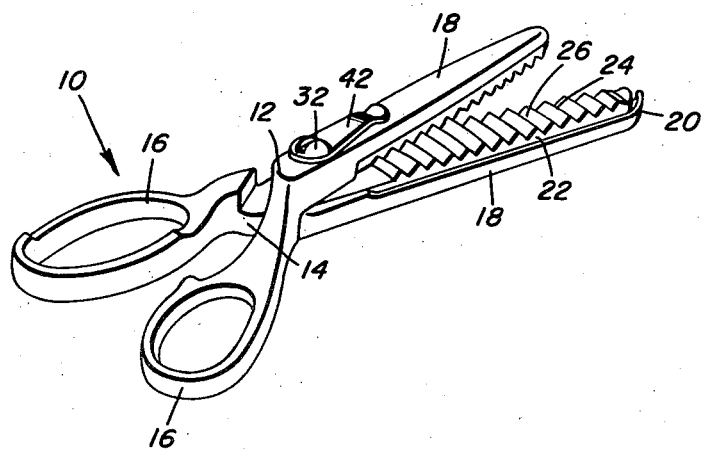
Figure 1 is a perspective view of the pinking shears of the present invention.
Figure 2:
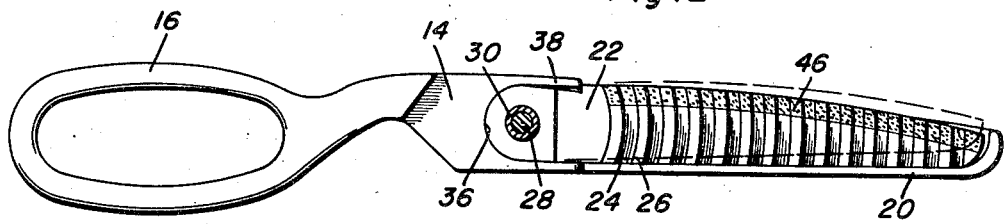
Figure 2 is a plan view of one-half of the pinking shears.
Figure 3:
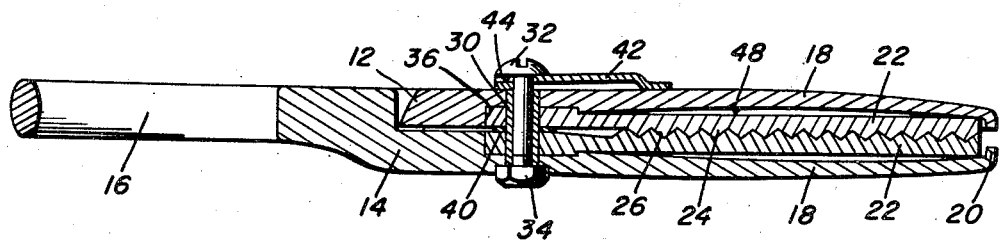
Figure 3 is a longitudinal, vertical sectional view of the pinking shears illustrating the construction thereof.
Figure 4:
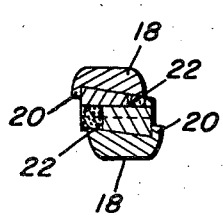
Figure 4 is a transverse, vertical sectional view of the cutting blades and their relationships.

Referring now specifically to the drawings, the numeral 10 generally designates the pinking shears of the present invention which includes a pair of pivotal members 12 and 14 having loop handles 16 at one end thereof and backing frames 18 at their other ends.

The backing frame 18 is provided with an inwardly extending flange 20 along the outer edge and ends thereof for receiving and positioning a blade 22. The blade 22 is provided with alternating arcuate ridges 24 and grooves 26 which are arcs of concentric circles with the concentric circles having a center coinciding with the center of a pivot pin 28 pivotally securing the members 12 and 14 together. The pivot pin 28 is provided with a sleeve bushing 30 and a slotted head 32 at one end thereof and a fastener nut 32 at the other end thereof. The support frames or backing frames 18 are also provided with a recess 36 receiving the inner ends of the blades 22 and a forwardly extending flange 38 is provided in spaced parallel relation to the inner end of the flange 20 whereby pivotal movement of the blade 22 about pivot pin 28 will be somewhat limited although the outer end of the blade 22 is not attached and is freely floating to permit the alternating ridges and grooves 24 and 26 to be self-centering during the cutting operation. A bearing washer 40 is disposed between the facing surfaces of the inner ends of the blades 22 and a spring member 42 is retained under the slotted head 32 of the pin 28 and extends longitudinally outwardly for engaging the backing frame 18 and urging the same toward the other backing frame 18. The portion of the spring 42 encircling the pivot pin 28 is provided with an upstanding detent 44 for positioning the spring 32 in longitudinal alignment with the backing frame 18.

The inner edges of the alternating ridges and grooves 24 and 26 are all hardened by a sintering process with the hardened portion being designated generally by the numeral 46. This hardened cutting edge is curved in a convex manner wherein the engaging ribs and grooves of the cutting edge are disposed in substantially parallel relation for effective cutting of cloth material. The backing frames 18 are provided with a slightly concave surface 48 whereby the resilient blades 22 are supported at their inner and outer ends to provide the inherent resiliency of the blades 22 for urging the blades toward each other whereby a more effective cutting operation will be obtained. The free floating arrangement together with the hardened edges of the blades permits long wearing thereof wherein the blades 22 may be replaced and the backing frames or casings 18 may be constructed of relatively inexpensive materials which may be re-used.

The blades 22, when pivoted towards each other, have adjacent edges which meet in diverging relation thus forming a cutting edge or point. The alternating ridges and grooves are relieved in order to provide clearance so that no interference occurs between the blades after the cutting edges have met and passed each other. The backing members may be constructed of light-weight material for reducing the occurrence of fatigue which sometimes occurs after prolonged use of a pair of scissors.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Pinking shears comprising a pair of pivotally connected blades, said blades having facing ribbed surfaces each comprising alternating ridges and grooves extending crosswise the blade in arcs of concentric circles having a common center, said ridges and grooves forming a continuous zig-zag cutting line along the edge of the blade, each blade including a backing frame having an inwardly extending flange on the outer edge thereof, said frame being separable from the blade with the blades and frames being assembled with a common pivot pin, the outer ends of said blades being freely floating thereby permitting self-alignment of the blades and registry of the zig-zag cutting edges.

2. Pinking shears comprising a pair of pivotally connected blades, said blades having facing ribbed surfaces each comprising alternating ridges and grooves extending crosswise the blade in arcs of concentric circles having a common center, said ridges and grooves forming a continuous zig-zag cutting line along the edge of the blade, each blade including a backing frame having an inwardly extending flange on the outer edge thereof, said frame being separable from the blade with the blades and frames being assembled with a common pivot pin, the outer ends of said blades being freely floating thereby permitting self-alignment of the blades and registry of the zig-zag cutting edges, said zig-zag cutting edges being hardened for increasing the cutting life thereof, the blades being formed of resilient material to provide lateral resiliency thereto.

3. Pinking shears comprising a pair of pivotally connected blades, said blades having facing ribbed surfaces each comprising alternating ridges and grooves extending crosswise the blade in arcs of concentric circles having a common center, said ridges and grooves forming a continuous zig-zag cutting line along the edge of the blade, each blade including a backing frame having an inwardly extending flange on the outer edge thereof, said frame being separable from the blade with the blades and frames being assembled with a common pivot pin, the outer ends of said blades being freely floating thereby permitting self-alignment of the blades and registry of the zig-zag cutting edges, said cutting edges being arcuate in a convex curve to provide parallel cutting edges on the mating ridges and grooves.

4. Pinking shears comprising a pair of pivotally connected blades, said blades having facing ribbed surfaces each comprising alternating ridges and grooves extending crosswise the blade in arcs of concentric circles having a common center, said ridges and grooves forming a continuous zig-zag cutting line along the edge of the blade, each blade including a backing frame having an inwardly extending flange on the outer edge thereof, said frame being separable from the blade with the blades and frames being assembled with a common pivot pin, the outer ends of said blades being freely floating thereby permitting self-alignment of the blades and registry of the zig-zag cutting edges, each of said frames including a pair of outwardly extending flanges adjacent the pivot pin for limiting the floating movement of the blade.

5. The combination of claim 4 wherein said pivot pin is provided with a bushing, and spring means on said pin for urging the blades together.

References Cited in the file of this patent

UNITED STATES PATENTS

| | | |
|---|---|---|
| 1,660,286 | Wilkes et al. | Feb. 21, 1928 |
| 2,284,664 | Kissling | June 2, 1942 |
| 2,595,033 | Wheeler | Apr. 29, 1952 |
| 2,701,415 | Carney | Feb. 8, 1955 |